Aug. 21, 1934.  L. B. GREEN  1,971,154
BEVERAGE WATER HEATER
Filed April 7, 1933  2 Sheets-Sheet 2
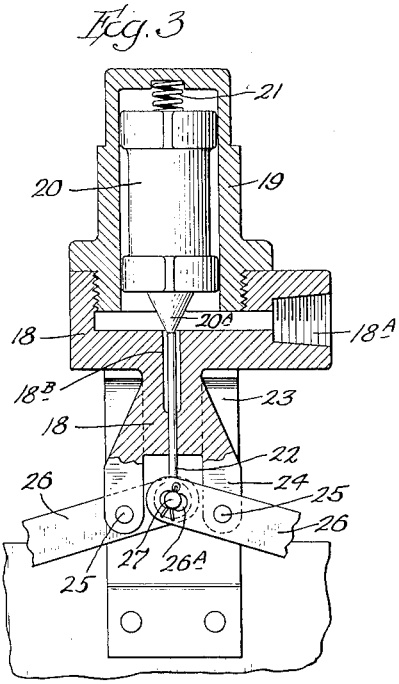
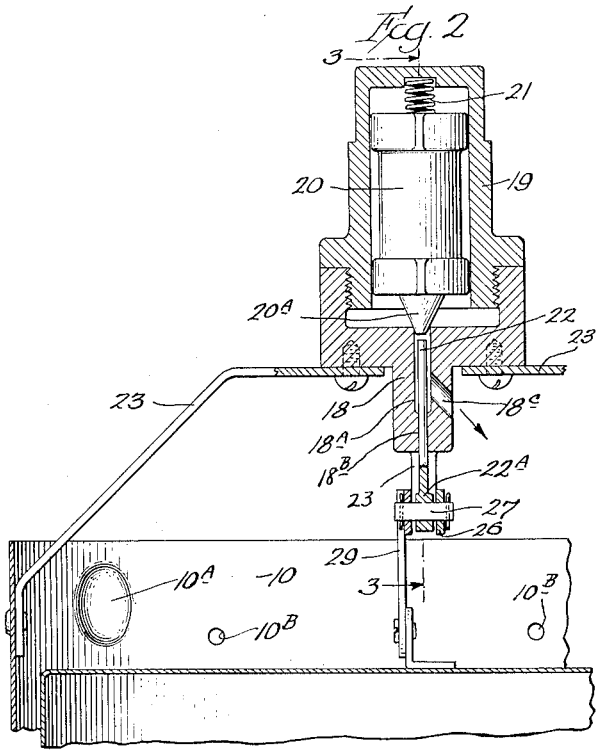
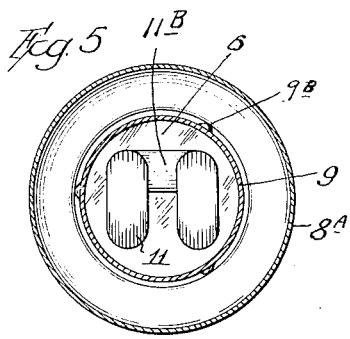
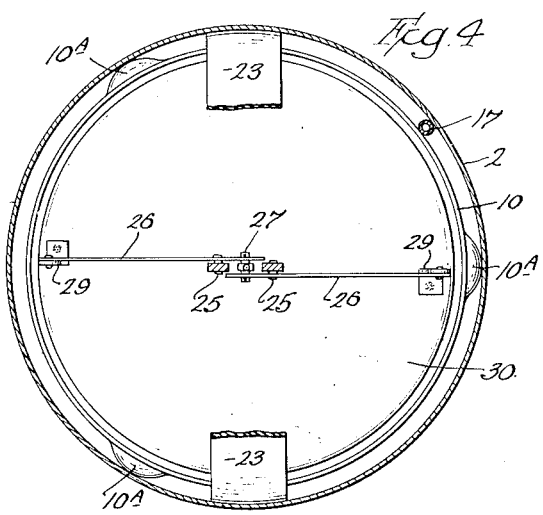
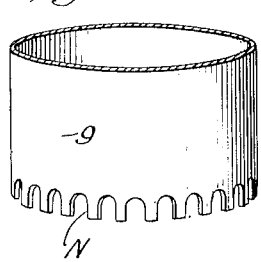
Inventor:
Lee B. Green
by Albert Scheibli
Attorney Patented Aug. 21, 1934

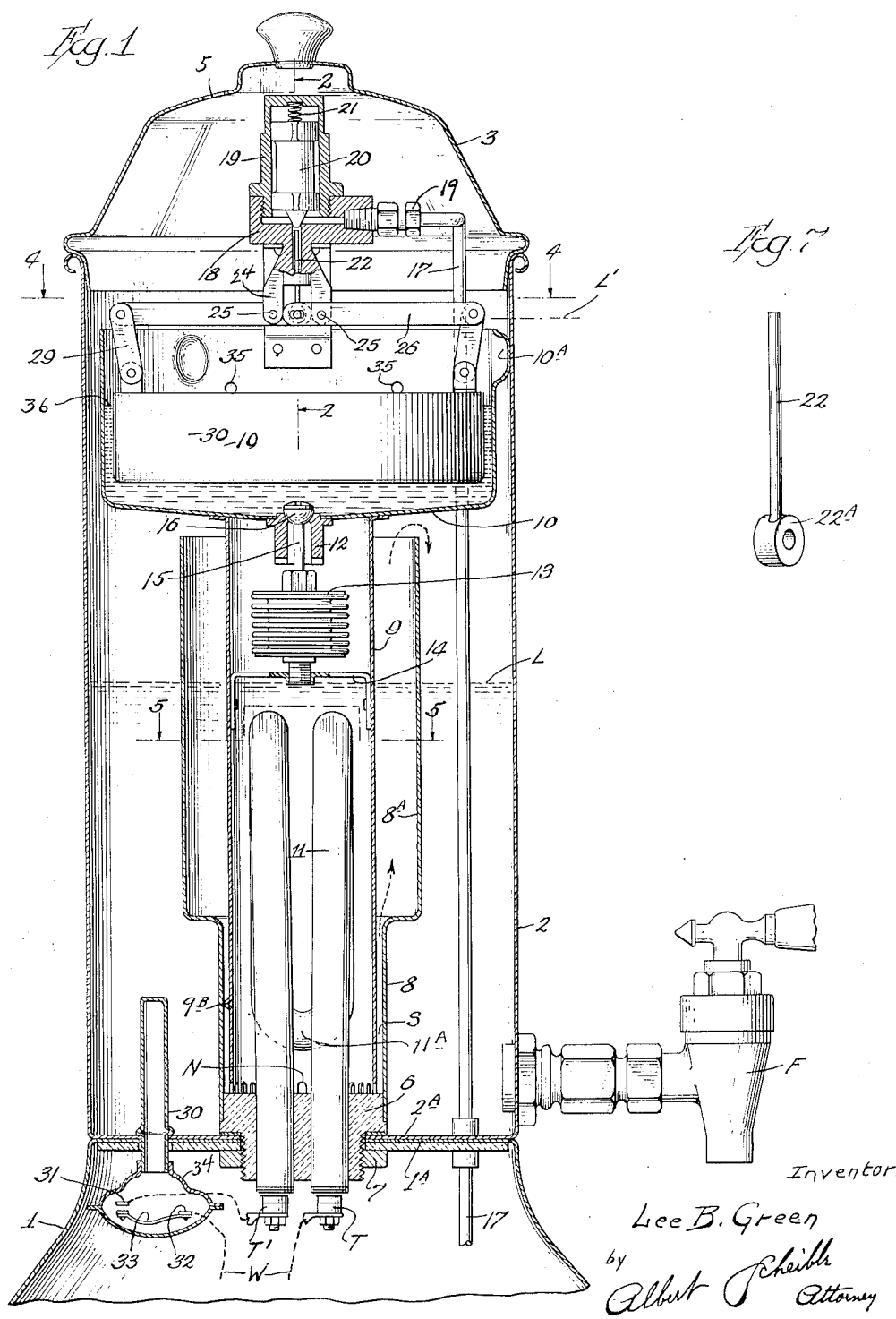

1,971,154

UNITED STATES PATENT OFFICE 1,971,154

BEVERAGE-WATER HEATER

Lee B. Green, Lakewood, Ohio

Application April 7, 1933, Serial No. 664,947

16 Claims. (Cl. 219—38)

My invention relates to an appliance adapted to be connected to a liquid-supply pipe for heating the supplied liquid and storing the heated liquid, and more particularly to a beverage-water heater to be used in lunch rooms and the like for providing a continuously available supply of hot water at an approximately constant temperature.

Generally speaking, the objects of my invention are those of providing an electric liquid-heating and hot-liquid storing appliance which will automatically control both the supply of cold liquid through a supply pipe and the supply of current for the heating. Furthermore, my invention aims to provide an appliance for this purpose in which simple control mechanisms will automatically compensate for fluctuations in both the pressure and temperature of the liquid supplied to the appliance, and in which the control means will also compensate for losses by radiation to the surrounding air so as to maintain the temperature of the stored hot liquid substantially constant. In addition, my invention aims to provide an appliance of the above recited characteristics which will be unusually simple, compact and inexpensive, and which will cause no appreciable amount of vapor to issue from it.

In the copending application for my Patent #1,920,013 on a Beverage heater I disclosed a beverage water heater designed for use on a dining table and arranged for automatically controlling the discharge of cold water from an elevated receptacle, which water is thereafter heated and passes into the hot-water storing portion of the appliance. In that device, the receptacle for receiving the cold water has to be manually refilled, while my present invention provides automatic means for supplying the cold water to a similar positioned receptacle from a water pipe connection.

In my also copending applications #600,877 and #621,821 I disclosed liquid heaters arranged for automatically controlling the supply of water together with the supply of current for the electric heating element in proportion of the quantity of the already stored hot water, the heating element being of a size suitable for adequately heating the water which flows past it when the water is supplied at approximately a constant pressure. In practice, the available water pressure is considerably lower on an upper floor of a building than on a ground floor, and also decreases with the distance from the water-pumping plant. Consequently, the appliances of my said copending applications (if marketed for interchangeable use at different elevations above the ground level, or for interchangeable use at different distances from the water-pumping station) either requires a corresponding adjustment to be made when it is installed, or else requires the use of an auxiliary water-pressure controlling appliance. Such a pressure-controller adds to the installation cost of the water heater, and so does the inclusion in the appliance of an electro-magnetic valve for controlling the feeding of water past an electric heating member, after the manner shown in both of my said copending applications.

My present invention aims to overcome all of the heretofore recited objections by a simple arrangement which eliminates the use of a liquid-pressure regulator, and which will enable a simple float-controlled valve to serve in place of both the more expensive electromagnetic valve and the water-pressure regulator.

Illustrative of a desirable embodiment of my invention, Fig. 1 is a central and vertical section through an automatically controlled beverage water heater, with the lower portion of the basal shell broken away and with the thermostatic control arrangement for the electric heating member shown diagrammatically.

Fig. 2 is an enlarged vertical section through the water-flow control valve and parts adjacent to it, taken along the line 2—2 of Fig. 1 with the valve closed.

Fig. 3 is a fragmentary section taken along the line 3—3 of Fig. 2, with the valve in its full-open position.

Fig. 4 is a horizontal section taken along the line 4—4 of Fig. 1.

Fig. 5 is a horizontal section taken through the tubular riser wall of the water-heating chamber along the line 5—5 of Fig. 1.

Fig. 6 is a perspective view of the lower end portion of the said riser wall.

Fig. 7 is an enlarged perspective view of the valve-lifting member.

In the drawings, the casing of my beverage-water heater includes an inverted cup-shaped base member 1 presenting a horizontal top 1A upon which top the bottom 2A of an upright container 2 is seated, the mouth end of this container being normally closed by a cover 3 carrying a knob 4 and the cover having a central air-vent tube 5 as shown in Fig. 1.

Extending through the bottom of the container and the top of the base member is a plug 6 of heat-insulating material which carries a nut 7 clamping portions of the said container bottom and base top, the plug being freely spaced from the riser wall of the container. Sealed at its lower end to the plug 6, as by tightly sleeving it upon the periphery of the upper end of the plug, is a tubular and upright baffle 8 which extends only for part of the height of the container.

Freely housed by this baffle and seated at its lower end on the plug 6 is a tube 9 which extends somewhat higher than the baffle and which has its upper end fastened and sealed (as by welding) to the bottom of a cold-water cup 10. The lower end portion of the tube 9 is so formed— as for example by providing it with downwardly open notches N (Fig. 6) as to afford passages connecting the bore of the tube with the lower portion of the annular space S between the said tube and the tubular baffle 8.

This baffle desirably has its lower portion of a bore diameter only slightly larger than the exterior diameter of the tube 9, so that the said space S is of small width around the lower portion of the tube; but the upper portion 8A of the tube may be of a considerably larger diameter, as shown in Fig. 1. The receptacle 10 desirably has its mouth end of a diameter smaller than the bore of the adjacent portion of the riser wall of the container, so as to permit heater water to accumulate also around the receptacle; and the riser wall of the receptacle desirably has outwardly projecting nubs 10A adapted to engage the bore of the container, so as to center the receptacle with respect to the container. With the tube 9 and the receptacle thus constructed, these nubs alone would approximately center the said tube with respect to the baffle, but the tube may also have auxiliary centering nubs 8B for engaging the bore of the lower baffle portion 8 as shown in Figs. 1 and 5.

Supported by the heat-insulating plug 6 and extending within the tube 9 for part of the height of that tube is an electric heating member 11 which presents its wire terminals T within the hollow base member. This heating member is here shown as of an inverted U-type with its shanks extending through the said plug and with its upper portion recurved downwardly, thereby reducing the height to which the heating member extends within the tube and concentrating more of the heating effect within the lower half of the tube.

The bottom of the receptacle has a perforation, desirably coaxial of the said receptacle, for discharging liquid into the interior of the said tube 9, and my appliance includes means for controlling this discharge according to the temperature within the upper portion of this tube.

For these purposes, Fig. 1 shows the receptacle bottom as sealed to a valve body 12 which has an upright tubular bore, and shows a thermally expansible member (such as the metal bellows 13 containing a small quantity of a volatile liquid) supported from the tube 9 by a strap 14 and freely spaced upwardly from the heating member 11. This thermally responsive member has its upper head fastened to a valve stem 15 which extends through the bore of the valve body and carries a valve member 16 adapted to seat on the upper end of that bore, the length of the valve stem being such that the movable valve member 16 will seat in this closure position (as shown in Fig. 1) when the appliance is at normal room temperatures.

Extending into the container exteriorly of the baffle tube and the receptacle is a water-supply pipe 17 which is connected at its upper end to a hollow valve body which has a valve-controlled outlet directed for discharging water into the receptacle 10. As here shown, the valve body comprises a bottom part 18 having a lateral inlet 18A (Fig. 3) to which the upper end of the water pipe 17 is connected by a coupling 19 (Fig. 1). This valve body is provided with an upright bore which has its lower portion 18B contracted in diameter, and also having a discharge bore 18C leading from the upper portion 18A of the said upright bore.

Threadedly connected to the bottom part 18 of the valve body is a cap 19 which slidably houses an axially upright weight 20, the lower end 20A of this weight being tapered to form a movable valve member adapted to seat on the upper end of the bore portion 18B to close the valve. The effect of gravity for thus seating the valve may be further reinforced by interposing a compression spring 21 between the weight and the top of the cap, thereby insuring a tight closure with a valve of small dimensions even against a high water pressure and also avoiding a noisy slamming of the weight against the top of the cap.

Extending slidably through the smaller-diametered lower portion of the bore 18 in the valve body is a valve-unseating pin 22 adapted to raise the weight valve member off its seat when this pin is slid upwardly.

The valve body is rigidly supported from the receptacle by two brackets 23 and this valve body has two ears 24 depending from it, as shown in Fig. 3. Pivoted respectively to these ears on horizontal and parallel pivot pins 25 are two levers 26 of the first class, which have their shorter arms conjointly pivoted to an eye 22A on the lower end of the valve pin 22 by a horizontal pin 27 parallel to the aforesaid pivot pins 25. To permit this pivoting while allowing for the arcuate movements of the adjacent ends of the two levers, the joint pivot pin 27 extends through an elongated perforation 26A (Fig. 3) in each lever and through the bore of the said eye 22A of the valve-lifting pin 22. Depending from and respectively pivoted to the longer ends of the two levers 26 are two links 29 which conjointly support a float 30, this float being of smaller diameter than the bore of the cup 10 and depending freely within the latter.

To control the operation of the heating member, I provide a thermostatic switch responsive to the temperature in the part of the container 2 which is radially outward of the baffle 8 and adjacent to the bottom of the container, namely the annular lower portion of the container which stores the heated water even when the quantity of stored water is small, and to which portion the usual faucet F is connected. For this purpose, Fig. 1 shows a thimble-shaped metal casing 20 extending through the bottom of the container and opening at its lower end into a housing 34; so that the parts 30 and 34 jointly form an air-filled casing, the upper portion of which normally is immersed in hot water stored in the container.

Then I connect one of the current-supply wires W to one terminal T of the electric heating member 11 and connect the companion wire W to a stationary contact 32 mounted within the housing 34, as shown diagrammatically in Fig. 1, and connect another stationary contact 31 within the same housing to the other terminal T of the electric heating member, I also dispose a bimetallic switching member 33 within the said housing 34, with one end thereof fastened to one stationary contact 32 and with the other end of this member disposed for engaging the companion contact 31 when cold.

When my above described water heater is empty and cool, and before water is supplied to the pipe 17 or current to the wires W, the float will be in a position lower than that of Fig. 1, namely with the levers and the lift pin 22 in their valve-opening positions of Fig. 3, in which positions the weight of the movable valve member and the spring 21 still cooperate to hold the float spaced somewhat upward from the bottom 2A of the water-receiving cup. Since all parts then will be at the temperature of the room in which the appliance is used, the bellows member 13 will be contracted to hold the cup-discharge-controlling valve member 16 in its closure position of Fig. 1; and with the heater cool, the bimetallic control member 33 will be flexed upward into engagement with the contact member 31.

When water is then admitted to the water duct 17 from a water pipe, water will readily flow through the hollow valve body and its discharge port 18C so as to fill the water cup to the water level 36 (as shown in Fig. 1) at which the float closes the water valve above the cup. When current is then supplied to the wires W, the heating element 11 warms the air within the upright tube 9, which tube together with the central portion of the cup bottom and the top of the plug 6 forms the heater chamber of my appliance. Since this chamber at that time is entirely closed except for the ports N close to its bottom, the hotter air quickly accumulates in the upper portion of this chamber, thereby vaporizing the ether or other volatile liquid inside the bellows 13 so as to cause the expansion of the bellows to raise the valve member 16 off its seat.

Water then flows down from the cup over the warmed bellows and the heating member 11, and whenever the level of the water in the cup falls appreciably, the float 30 opens the water-control valve above it so as to replenish the water in the cup.

Owing to the passages N which connect the lower end of the said heater chamber with the bore of the tubular baffle, the warmed water accumulating within the lower portion of the tube 9 also rises to the same level in the annular space S between that tube and the lower portion 8 of the baffle; and with this space of quite small radial width, the water within it is quickly heated further by conduction through the metal tube 9 from the water inside this tube.

With the wattage of the heating member suitably proportioned to the volume of the interior of the said heating chamber and to the area of the cup-discharge valve when the latter is open, the temperature of water inside this chamber and in the annular space between the tube 9 and the baffle rises rapidly. And, since the downward flow of water through the valve body 12 together with the water in the cup retard a ready emission of steam through this valve, the vapor pressure within the upper part of the tube 9 soon rises and exerts such pressure on the accumulated hot water within the tube as to force water through the passages N and upwardly in the annular space between this tube and baffle 8, thereby causing water to be discharged over the top of the tubular baffle before this water has reached its boiling point. Consequently, with the above mentioned suitable proportioning the water stored in the annular space surrounding the baffle will be at a temperature sufficiently below the boiling point of water (as for example about 190 degrees Fahrenheit) to be immediately suitable for beverage use.

During the initial water-heating and water-storing operation, the stored water is somewhat cooled both by radiation through the riser wall of the container, by the cooling effect of water in the supply duct 17 which extends through this stored hot water, and by the cooling effect of the cold water in the cup 10 on the air above the stored water. However, this cup is also warmed by the heat from the heating member, and the pre-warming of the supplied water within the duct 17 augments also increases the temperature of the water within the cup, so that the temperature of the air above the stored water rises likewise. When this stored water reaches the temperature for which the bimetallic control element 33 was designed (namely the maximum temperature suitable for the desired beverage purpose), this control element will flex away from the contact 31 so as to open the circuit to the heating member as shown in Fig. 1. Then the temperature within the heater chamber soon drops so as to cause the thermostatic bellows to close the cup-discharge valve.

This leaves my water heater with the parts positioned as shown in Fig. 1, namely with both valves closed, with no current flowing through the heating member; with hot water stored at approximately a common level both within the baffle and the heater chamber and around the baffle, as for example the level L; and with sufficient water in the cup to maintain the float in the raised position in which the float holds the water-supply valve closed. Since the volume of water in the cup can be quite small in proportion to that of the stored hot water, and since this water is in a cup spaced upwardly from all of the hot water within the appliance, the cooling effect of water in the cup on the stored hot water is much less than in the appliance disclosed in my application #600,877 in which a central riser tube extending high above the level of the stored hot water is almost filled with cooler water whenever the current is automatically shut off.

However, conduction through the metal tube 9 and through the air above the stored hot water, together with radiation through the wall portions of the container to the surrounding air, will gradually reduce the temperature of the stored hot water. Whenever this temperature drops sufficiently, the bimetallic control member 33 closes the circuit to the heating member 11 for a sufficient period to permit additional and hotter water (discharged over the top of the baffle) to raise the temperature of the stored water to that at which the said control member again halts the operation of the heating member.

In practice, the level of the stored water during the periods in which the current is automatically shut off may vary greatly, according to the extent to which stored hot water is drawn off from the lower portion of the annular storage chamber through the faucet F. And if there is no withdrawal of hot water for a long period of time—as for example at night—this water level may rise along side the cup even beyond the level of the upper edge of the water cup 10, thereby causing stored hot water to flow over the mouth of the cup into the latter, thereby filling the entire interior of the container to the level $L^1$ of Fig. 1; or at least up to apertures 35 (Fig. 1) which may be provided in the riser wall of the cup above the level 36 at which the float closes the water-control valve.

With the water at this extreme level, water would also fill the tube 9 for its entire height, so that the automatic opening and closing of the cup-discharge valve would have no effect, and the temperature-controlling bimetallic element 33 would still function as before.

When sufficient hot water has then been withdrawn through the faucet F so that the level of the stored water around the baffle drops below the top of this baffle, the next opening of the cup-discharge valve would cause the weight of water in the cup to force water from within the baffle over the top of the latter, and the resulting fall in the level of water within the cup would continue until this level drops slightly below that shown at 36 in Fig. 1.

Thus, my appliance may be operated with a total water-storing capacity up to that corresponding to the said level $L^1$ or the somewhat lower level corresponding to the lower edges of the cup perforations 35 if these are provided, so as to utilize a much larger portion of the interior content of the container for the hot-water storing than is possible with the water heaters disclosed in my said previously filed applications.

In practice, the discharge bore 28 of the water-valve is desirably of such an area that the discharge water quickly restores the float to its valve-closing height, so that the float can be quite sensitive in its control; and the cup-discharge valve preferably is formed to afford a large opening, so as to avoid having it clogged by possible impurities in the water.

Since the cold water is first admitted to the cold water cup and then issues from the cup into the heater tube under the quite nominal head corresponding to the low depth of water in the cup, the operation of my appliance is independent of the pressure of the water supplied to the water pipe 17. That is to say, a rise or fall of the available water pressure merely means a corresponding shortening or lengthening of the time required for refilling the cup (to the height at which the float closes the water valve) after the level of water in the cup has dropped to a given extent.

Consequently, my appliance will function equally well in any story of a building and at any distance from the water-pumping plant, so long as the water pressure is ample for forcing water through the water pipe 17. Moreover, if the water supply to the building should be interrupted, or if the water connection to the said pipe 17 were shut off so that the cup would be left empty, the thermostatic current-control device would still shut off the current as soon as the interior of the container reached the limiting temperature for which this part of my appliance is designed. Likewise, if the supply wires W were initially connected to a circuit without any connection of the water pipe 17 to a water pipe of the building and with the water cup 10 empty, this would merely allow the entire interior of the container to reach the temperature for which the current-control device (here shown as including a bimetallic strip) is designed, without burning out the heating member.

In practice, I desirably dispose the discharge bore 18C of the body of the valve body so as to direct the water discharge away from the levers associated with the float, as shown in Fig. 2, thereby preventing water from being splashed over the edge of the cup. I also desirably have the water pipe 17 extend upwards through the stored hot water (so that water in this pipe will be prewarmed and between the mouth edge of the cup and the riser wall of the container (as shown in Fig. 4), and with the upper portion of this pipe bent to extend horizontally above the cup as shown in Fig. 1.

With the horizontal upper end portion of the pipe at higher elevation than the top of the container body 2, a disconnecting of the coupling 19 from the body of the water valve will allow the said pipe to be rotated about the axis of its upright portion so as to be swung outwardly; thereby permitting the riser tube 9, the water cup 10, the float and lever assembly, and the valve body to be detached as a unit from the container for adjustments, repairs or thorough cleaning.

With the bore of the cup-discharge outlet 12 of much smaller diameter than the bore of the riser tube 9, and since this cup outlet bore has the stem 15 of the bellows-controlled valve member extending through it, water can flow into this tube only in a small-diametered stream in comparison with the cross-section of the bore of the tube. And, since this stream is broken up by impinging on the bellows member 13 (and partially also on the bellows-supporting bracket 14), the water is broken up into minute drops before it reaches the heating member, so that this heating member speedily heats the admitted cold water.

Moreover, if the cooling effect of the admitted water on the thermostatic bellows member increases with the coldness of this water so as to cause the bellows to contract, and this cooling effect grows less when the water flowing out of the cup is warmer, so that the thermostatic bellows automatically readjust the rate at which water flows out of the cup, according to the temperature of the water. Consequently, my here presented water heater automatically compensates for changes in the temperature of the admitted water (which will vary greatly according to the season of the year), so as to proportion the water admitted to the interior of the riser tube 9 (or into my socalled heater chamber) to the capacity of the electric heating member. No similar automatic adjustment could occur with water heaters in which the supply of water to the heater chamber is responsive only to the level of the stored hot water, as in the appliance of my Patent #1,901,028 of March 14, 1933, so that my here presented water heater supplies the stored hot water at a much more uniform temperature, although also receiving water from a connection to a water-supply pipe.

Since any steam passing upward through the valve body 12 will be condensed by water in the cup, no appreciable amount of steam or water vapor issues through the cover vent 5 during the normal operation of my appliance, so that I entirely avoid the damaging of walls or ceilings (or the fogging of mirrors and window panes) which commonly occurs with the water heaters now employed in restaurants, drug stores and the like. In addition, I can provide a much greater cup-per-hour capacity with an appliance of given height and diameter than has been found possible with those now in common use, and with my entirely automatic control means no skilled attendants are required. Furthermore, by controlling the current in response to the temperature of the stored hot water, I entirely avoid the drawing of undesirably hot water and automatically compensate for variations in the heating capacity of the electric heating member.

However, while I have heretofore described my invention in an embodiment in which the cup (or cold-water-receiving receptacle) supports the water-supply control means, and in which the just named control means together with the cup and the partitioning means for guiding liquid from the cup to the hot-water storing chamber form a unit detachable from the container which affords this chamber, I do not wish to be limited in these respects, since many changes could obviously be made in the construction and arrangement of my liquid-heating and hot-liquid storing appliance without departing either from the spirit of my invention or from the appended claims. Nor do I wish to be limited to the use of my automatically controlled appliance in connection with water, since it obviously would function with equal advantages for other liquids.

I claim as my invention:

1. A water heater comprising a container, a water-receiving cup supported within the container at a considerable elevation above the bottom of the container; partitioning means dividing the space within the container below the cup into a heater chamber into which the said port opens, and a hot-water storing chamber; the cup having a discharge port opening into the heater chamber; a heating member within the heater chamber; means responsive to the temperature within the heater chamber for controlling the said port; a duct for supplying water to the cup, and control means responsive to the level of water within the cup for controlling the said supply of water to the cup by the said duct.

2. A water heater as per claim 1, and in which the water supply means include a valve body supported by the cup and a water duct detachably connected to the said valve; the said tube, cup and valve body being detachable as a unit from the container when the said duct is detached from the valve body.

3. A water heater comprising a water-receiving cup, an upright tube sealed at its upper end to the cup, the cup having a port for discharging water by gravity from the cup into the said tube; a heating member disposed within the said tube; a container including a hot-water storing chamber disposed for receiving the water after it has been heated by the heating member; a duct for supply water to the cup, means responsive to the level of water in the cup for controlling the said supply of water to the cup, and means responsive to the temperature within the said tube for controlling the said port.

4. In a water heater, a cold-water receiving cup having a discharge port in its lower portion, a valve controlling the port, means for heating the water after its discharge through the said port, a water-supply duct presenting an outlet above the cup for discharging cold water into the cup, and means responsive to the level of water in the cup for controlling the discharge of water from the duct.

5. In a water heater, a cup having a discharge port in its lower portion, a valve controlling the port, means for heating the water after its discharge through the said port, a water-supply valve including a hollow body disposed for discharging water into the cup and a movable valve member, means rigidly supporting the valve body from the cup, a float disposed within the cup, and connections between the float and the said member whereby movement of the float controls the passage of water through the valve body.

6. In a water heater, an assemblage of elements as per claim 3, in which the movable valve member is vertically slidable in the valve body and urged by gravity to its closure position, and in which the said means including a valve-unseating member slidable in the valve body and disposed for raising the said valve member out of its closure position when a lowering of the float moves the said lever in one direction.

7. In a water heater, a water-receiving cup having a discharge port in its lower portion, means for heating the water after its discharge from the said port, means intermittently controlling the said port, a hollow valve body arranged for discharging cold water into the cup, means supporting the valve body from the cup, two levers of the first class pivoted upon the valve body, a float supported by one end of each lever and disposed within the cup, a valve member movable in the valve body for controlling the discharge of cold water into the cup, and means operatively interposed between the other ends of the levers and the valve member for controlling the position of the said valve member.

8. In a liquid heater in which liquid is admitted downwardly into an upright tube housing an electric heating member and is emitted from the lower end portion of the tube, an inverted U-shaped heating member disposed within the tube and recurved transversely of the common axial plane of its shanks to present its U-bend near the lower end of the tube, the recurved portion of the shanks of the heating member together with the said U-bend being freely spaced from other shank portions of that member to permit liquid to flow freely therebetween.

9. In a liquid heater, an upright tube and heating member assemblage as per claim 8, including an upright tubular baffle freely housing the said tube and into the lower portion of which baffle the tube opens, the part of the tube which houses the U-bend of the heating member being at less spacing from the baffle than the part of the tube which houses the upper end portions of the heating member.

10. A liquid-heating and liquid storing appliance comprising a container having a chamber for storing hot liquid, a receptacle spaced upwardly from the bottom of the said chamber and having an outlet through which liquid is discharged from the receptacle; liquid-guiding means through which liquid discharged from the receptacle passes to the said chamber; heating means associated with the liquid-guiding means for heating liquid while passing through the said means; control means responsive to the temperature within a portion of the liquid-guiding means for controlling the discharge of liquid from the receptacle into the liquid-guiding means; a duct for supplying cold liquid to the receptacle; a second control means, responsive to the level of liquid in the receptacle, for controlling the supply of cold liquid to the receptacle; and a third control means, responsive to the temperature of the liquid stored in the said chamber, for controlling the operation of the heating means, the said three control means serving as the sole means for automatically controlling the appliance to maintain a supply of stored liquid at constant temperature in the said chamber.

11. A water heater comprising a container, a water-receiving cup supported within the container at a considerable elevation above the bottom of the container, the cup having a discharge port in its bottom; a heating member disposed within the container below the said port and over which the water discharged through the port will flow; a water-supply duct extending into the container having its outlet end overhanging the cup; a valve supported independently of the cup by the said duct and controlling the discharge of water from the said outlet end of the duct into the cup, a float disposed within the cup, and instrumentalities supported by the said valve and supporting the float whereby vertical movements of the float control the said valve.

12. A water heater as per claim 11, including connecting means above the cup for detachably connecting the said valve to the said duct, whereby a releasing of the said connecting means permits the said tube, cup, float, valve and instrumentalities to be withdrawn as a unitary assemblage from the container.

13. In a water heater of the type in which water is discharged by gravity through a port in the bottom of a cold-water-receiving cup supported within a container and at a considerable elevation above the bottom of the container, and in which the water discharged through the said port is thereafter heated and guided over a tubular baffle to an annular hot-water storing container portion overhung by the radially outer part of the cup, a duct separate from the said port for supplying cold water to the cup; and means including a float disposed within the cup for controlling the said duct; the cup having the major portion of its riser wall freely spaced from the riser wall of the container to permit stored hot water to extend between these walls, and the cup having its riser wall provided with a perforation having its lower edge at an elevation above the level of water in the cup at which the float closes the valve.

14. In a water heater of the class in which cold water is received by a cup and discharged downwardly over a heating member, a water-receiving cup, a water supply duct presenting its outlet end above the said cup, a hollow body having a water passage connected at one end to the said outlet end of the duct and opening at its other end directing a discharge of water into the cup, and means supported entirely by the valve body for controlling the said discharge, the said means including a float disposed within the cup.

15. A water-heating and hot-water storing appliance comprising a container, a cup-disposed within the container and spaced upwardly from the bottom of the container; a partition member interposed between the bottom of the container and the cup for affording a heater chamber below the cup and an annular hot-water-storing chamber at lower elevation than the bottom of the cup, the cup having a port for discharging water from the cup into the heater chamber; a duct leading into the container for supplying water to the cup; an electric heating member disposed within the heater chamber; first means responsive to the level of water in the cup for controlling the supply of water from the said duct to the cup, second means responsive to temperature within the heater chamber for controlling the said port; and third means responsive to the temperature of water within the hot-water-storing chamber for controlling the operation of the heating member; the said three means comprising the sole means for automatically controlling the operation of the appliance for heating water supplied through the said duct and for maintaining a supply of hot water at substantially constant temperature in the said hot-water-storing chamber.

16. A water-heating and hot-water storing appliance as per claim 15, in which the cup and the partitioning member constitute a rigid unit supporting the said first and second control means.

LEE B. GREEN.